(12) United States Patent
Bardelli

(10) Patent No.: US 8,329,781 B2
(45) Date of Patent: Dec. 11, 2012

(54) THERMOSETTING POWDER PAINTS

(75) Inventor: Angelo Achille Bardelli, Buguggiate (IT)

(73) Assignee: INXEL Trademarks & Patents SAGL, Milan (IT)

( * ) Notice: Subject to any disclaimer, the term of this patent is extended or adjusted under 35 U.S.C. 154(b) by 786 days.

(21) Appl. No.: 11/993,712

(22) PCT Filed: Sep. 19, 2005

(86) PCT No.: PCT/IT2005/000536
§ 371 (c)(1),
(2), (4) Date: Dec. 21, 2007

(87) PCT Pub. No.: WO2007/007359
PCT Pub. Date: Jan. 18, 2007

(65) Prior Publication Data
US 2010/0080923 A1    Apr. 1, 2010

(30) Foreign Application Priority Data
Jul. 8, 2005    (IT) .................................. MI05A1303

(51) Int. Cl.
C08K 9/04    (2006.01)
(52) U.S. Cl. ........ 523/208; 523/205; 523/207; 427/485; 524/592; 524/593
(58) Field of Classification Search .................. 524/431, 524/904, 592, 593; 428/403; 523/205, 207, 523/208; 427/485
See application file for complete search history.

(56) References Cited

U.S. PATENT DOCUMENTS

| | | | |
|---|---|---|---|
| 2,913,348 A | 11/1959 | Jackson | |
| 3,112,289 A | 11/1963 | Stocker | |
| 3,849,150 A | 11/1974 | Schrempp et al. | |
| 4,003,872 A * | 1/1977 | Rolles et al. | 523/457 |
| 4,049,615 A | 9/1977 | Elsener et al. | |
| 4,464,203 A | 8/1984 | Horst et al. | |
| 4,664,711 A | 5/1987 | Kawaguchi et al. | |
| 5,182,324 A | 1/1993 | Osada et al. | |
| 5,411,802 A | 5/1995 | Kumar et al. | |
| 5,470,893 A * | 11/1995 | Sinclair-Day et al. | 523/205 |
| 5,635,548 A * | 6/1997 | Kittle et al. | 523/220 |
| 5,728,779 A * | 3/1998 | van de Werff et al. | 525/438 |
| 5,856,378 A * | 1/1999 | Ring et al. | 523/205 |
| 5,925,698 A * | 7/1999 | Steckel | 524/322 |
| 6,280,798 B1 * | 8/2001 | Ring et al. | 427/459 |
| 6,544,327 B1 * | 4/2003 | Griessmann et al. | 106/417 |
| 6,734,231 B2 | 5/2004 | Creusen et al. | |
| 2003/0029358 A1 * | 2/2003 | Roberts et al. | 106/499 |
| 2003/0033958 A1 * | 2/2003 | Creusen et al. | 106/31.13 |
| 2004/0022749 A1 | 2/2004 | Malnou | |
| 2004/0220322 A1 * | 11/2004 | Gooding et al. | 524/502 |
| 2008/0206568 A1 * | 8/2008 | Bardelli et al. | 428/407 |

FOREIGN PATENT DOCUMENTS

| | | |
|---|---|---|
| DE | 4200459 A1 | 7/1992 |
| DE | 19813394 A1 | 9/1999 |
| EP | 0425439 A2 | 5/1991 |
| EP | 0432480 A2 | 6/1991 |
| EP | 1118645 A | 7/2001 |
| EP | 1 566 419 A | 8/2005 |
| GB | 1224627 A | 3/1971 |
| GB | 1588777 A | 4/1981 |
| JP | 1174591 A | 7/1989 |
| WO | 9928390 A | 6/1999 |
| WO | 0121371 A1 | 3/2001 |
| WO | 2004074382 A2 | 9/2004 |
| WO | 2004078852 A1 | 9/2004 |
| WO | 2005054381 A1 | 6/2005 |
| WO | 2005080514 A1 | 9/2005 |
| WO | 2006082603 A1 | 8/2006 |
| WO | 2007007359 A1 | 1/2007 |
| WO | 2007080612 A1 | 7/2007 |
| WO | 2008012848 A1 | 1/2008 |

OTHER PUBLICATIONS

BASF: Pigments, pigment preparations, soluble dyes, binders, crosslinkers, light stabilizers for coatings, 2004.*
"PCT International Search Report dated Mar. 10, 2006 for PCT/IT2005/000536, from which the instant application is based," 3 pgs.
"PCT Written Opinion dated Mar. 10, 2006 for PCT/IT2005/000536, from which the instant application is based," 6 pgs.
"PCT International Preliminary Report on Patentability dated Jan. 10, 2008 for PCT/IT2005/000536, from which the instant application is based," 7 pgs.

* cited by examiner

Primary Examiner — Liam Heincer
Assistant Examiner — Michael A Salvitti
(74) Attorney, Agent, or Firm — Fredrikson & Byron PA

(57) ABSTRACT

Thermosetting colored powder paints to be used in electrostatic painting processes are described. These powder paints comprise not more than 30% by weight of at least one monochromatic pigment coated with at least one aldehyde and/or ketone resin, preferably 5 to 30% by weight, and up to 95% by weight of conversion agent, preferably 70 to 95% by weight; more than 90% of the particles of said at least one coated monochromatic pigment and said conversion agent have a particle size of between 10 and 40 microns, preferably between 15 and 35 microns. The coated monochromatic pigment and the conversion agent have the same specific weight which is between 1.3 and 1.7 g/cc.

18 Claims, No Drawings

THERMOSETTING POWDER PAINTS

RELATED APPLICATIONS

This application claims priority to International Application No. PCT/IT2005/000536 filed Sep. 19, 2005, and to Italian Application No. MI2005A001303 filed Jul. 8, 2005, the teachings of which are incorporated herein by reference.

The present invention relates to a method for the production of thermosetting powder paints, in particular for application by means of electrostatic plants.

BACKGROUND ART

During the last twenty years thermosetting powder paints have replaced solvent-based liquid thermosetting paints, resulting in considerable advantages in ecological terms owing to elimination of the solvent in which the solid components forming the coating paint were dissolved.

The methods used envisage so-called fluid beds, inside which the powder paint is kept suspended inside a container, by means of a homogeneously distributed carrier gas (air), and the pre-heated metal part to be painted passes through this powder haze.

The powder melts on the surface of the part and adheres to it.

In the case of oven treatment, the powder undergoes a thermosetting reaction and becomes solid and fused with the part.

Electrostatic spraying plants which imitate the abovementioned plants for performing liquid painting with solvent paints are widely used.

These plants consist of a part similar to the abovementioned fluid bed, inside which the powder paint is kept mixed with a gas (air).

This mixture is then transferred by means of pipes to a powder spray gun inside which an expelling thrust is imparted to this mixture by means of a Venturi tube.

During transfer, the rubbing of two particles together produces a large quantity of electrostatic charges which accumulate on the ends of the powder paint particles, thus forming an electrostatic charge.

A magnetic field is generated between the tip of the spray gun and the part to be painted, this field having the effect that the particles, during their propelled movement, move along magnetic field lines.

A more recent technology increases this movement of the particles under the influence of the magnetic field in that it creates a difference in potential of more than 100,000 Volts between the needle of the application nozzle and the part to be painted.

The movement in these magnetic fields gives rise to various phenomena:
  particles which are similar, but have a different specific weight, follow different paths;
  particles with different shapes, and hence with a varying charging capacity, follow different paths;
  particles with different dimensions follow different paths;
  particles with a different chemical composition are charged differently and follow different paths;
  particles which are entirely identical in terms of composition and form, but which receive a different thrusting force, move along different paths.

All of this, which has been widely established, has led paint manufacturers to produce formulations where all the powder paint components undergo a premixing step which is performed before extrusion of all the components, in order to render them uniform and homogeneous, and are then ground using mills of varying types so as to convert them into the powder state.

A powder which is homogeneous in terms of its composition, specific weight and form, but non-homogeneous in terms of size, is thus obtained.

With these characteristics, the powder paint is suitable for coating the article in a homogeneous manner, except for the surplus of a small part of powder paint which, owing to its particle-size distribution, cannot be easily transferred onto the part.

The larger particles which are propelled with a greater kinetic energy escape from the electrostatic field and travel further.

The particles which are too fine either do not receive sufficient energy to reach the part or along the path are attracted also by other elements and fall onto the bed of the spraying booth.

In any case that part which is deposited onto the part is homogeneous and, after melting, forms a homogeneous film of paint, where the various pigments, to the naked eye, cannot be distinguished as a heterogeneous system, exactly in the manner of liquid paints.

Consequently the blue particles and yellow particles of a green will not be visible, but instead a green homogeneous surface.

The result would not be so if, instead of applying this powder paint, a mixture of two powder paints were to be prepared in the manner described above and applied, i.e. a yellow coloured paint and a blue coloured paint mixed together and then applied.

The mixture of the two powder paints, with a different specific weight and different particle-size curve, under the effect of the magnetic field is transferred onto the part with a composition different from that supplied, producing a shade different from that intended.

Moreover, the continuous varied consumption in the end will result in one of the two paints being left over.

Furthermore, the large-size particles normally used, ranging from 20 to 100 microns and the binders normally used with a low molecular mobility, such as polyesters or epoxy polyesters or epoxides or acrylics which must impart functional properties to the powder paint, are such that the surface of the painted part will not have a homogeneous green colour, even if the transfer had been performed in a perfect manner, but will appear like a paint broken down into blue and yellow parts which are very small, but visible.

DESCRIPTION OF THE INVENTION

In order to overcome these drawbacks it has been discovered that, in the case of chromatic monopigment basic colours, by means of control of a specific particle-size curve for particles of less than 20 microns, it is possible to mix them and obtain complete and finished powder paints also in the desired colour, while obtaining minimum waste during electrostatic application and a homogeneous colour on the surface. The non-homogeneous mixtures of powder paints, obtained by mixing two or more powder paints, are used in a suitable manner to obtain special non-homogeneous effects, where separation of the basic colours form the special feature of the product.

The task of the present invention is to provide a system which embraces simultaneously different qualitative compositions, composed of conversion agents in which pigments pre-coated with aldehyde resins may be mixed so as to obtain powder paints with polyesters, polyesters cross-linked with epoxides, epoxies and acrylics, both in a glossy form and in a semi-glossy, matte, embossed, textured or metallized form.

Within the context of this task, one object of the invention is to provide a method for producing a mixture which gives rise to a powder paint which behaves like the powder paint produced by pre-mixing of raw materials, extrusion and subsequent milling; without the typical abovementioned drawbacks of physical mixtures of powder paints.

These and other objects, which will be described more clearly below, are achieved by a method for producing thermosetting powder paints, in particular for application by means of electrostatic plants, characterized in that it comprises a system for cold and dry mixing pre-coated pigments, to be used in an amount of less than 30% with conversion agents in an amount greater than 70%, forming powder paints, chromatically non-pigmented or pigmented with chromatic monopigment.

Further characteristic features and advantages of the present invention will emerge more clearly from an examination of the description of a preferred, but not exclusive embodiment of the invention, illustrated by way of a non-limiting example in the accompanying drawings, in which the sole FIGURE is a block diagram which illustrates the method for producing paints according to the invention.

The method according to the invention is designed in particular to formulate paints, in the form of a thermosetting coloured powder, intended to be applied by means of electrostatic plants.

With the method according to the present invention it is possible to construct a powder painting system where the individual colouring components and the vehicle conferring quality form a whole where the particles move indistinguishably along the lines of the magnetic field, in keeping with the principles of physics, obtaining industrial results with uniform colouring not dissimilar to the conventional systems used hitherto.

With the method according to the present invention it is possible to reproduce the results of a uniform transfer in electrostatic spraying plants and of a uniform coloured surface, obtained hitherto using conventional production methods.

With the present invention it is possible to produce powder paints, by preparing beforehand extruded and milled semi-finished products, conversion agents and pre-coated pigments and then mixing the various colorimetric compositions depending on the colour required, without the drawback of alteration of the colour as a result of varied movement of the particles and avoiding a non-homogeneous surface colour.

The system is constructed by preparing:
a group of pre-coated pigments prepared in accordance with the description of international patent application PCT/IT2005/000443 filed on 26 Jul. 2005 by the same applicants, which is incorporated herein by way of reference; these pre-coated pigments form the part of the system which will confer colour to the painted surface;
a group of conversion agents will ensure the final quality in the powder paint to be obtained; these will be produced in keeping with the ordinary powder paint methods already described;
a selected conversion agent will be associated with each quality and a suitable weighted quantitative mixture of pre-coated pigments with each colour required.

The final powder paint will therefore be obtained by following the instructions for a formula where it is envisaged mixing in a selected conversion agent, chosen in accordance with the functional characteristics required of the final paint, a mixture of the pre-coated pigments, selected in accordance with the colorimetric characteristics of each of them, so as to obtain the final colour required as per the formulation system.

The ratios tested and required for the production of finished powder paints range from a minimum of 70% conversion agent up to a maximum of 30% pre-coated conversion agent.

|  | Minimum % | Maximum % |
| --- | --- | --- |
| Pre-coated pigment mixture | 5 | 30 |
| Powder conversion agent | 70 | 95 |

In some cases, it is envisaged using a conversion agent not devoid of monochromatic pigment, but instead pigmented with a monochromatic pigment to be transformed in the final colour as per the procedure for a neutral conversion agent.

This is the case of conversion agents already pigmented with white titanium dioxide used to obtain very light colours, in which the system will be even more cost-effective and technically acceptable, in accordance with the present patent.

All the components, whether they be pre-coated pigments or conversion agents, and consequently the powder paints produced with them, must have:
a composition such that the specific weight of each of them is within a range of ±0.10 g/cc; different models with different specific weight levels from a minimum of 1.3 to a maximum of 1.7 g/cc were tested;
preferably, for a universal system, a specific weight of about 1.5 g/cc;
a particle-size curve, where 90% must be within the range of 10-40 microns.

DETAILED DESCRIPTION OF THE INVENTION

The present invention therefore relates to a thermosetting powder paint comprising not more than 30% by weight of at least one monochromatic pigment coated with at least one aldehyde and/or ketone resin, preferably from 5% to 30% by weight, and up to 95% by weight of conversion agent, preferably from 70% to 95% by weight, in which more than 90% of the particles of said at least one coated monochromatic pigment and of said conversion agent have a particle size of between 10 and 40 microns, preferably between 15 and 35 microns.

According to one of the preferred aspects of the invention, said at least one coated monochromatic pigment and said conversion agent will have the "same" specific weight whereby this term is understood as implying a maximum variability of ±0.1 g/cc; in particular the specific weight of said at least one coated monochromatic pigment and the specific weight of said conversion agent will be between 1.3 and 1.7 g/cc.

According to a further aspect of the invention, said at least one aldehyde and/or ketone resin has a mean molecular weight of between 800 and 2000 Da, preferably between 900 and 1400 and/or melting point of between 70° and 130° C., preferably between 90° and 120° C.

For the purposes of the present invention, "aldehyde resin" may be understood as meaning the condensation product of aliphatic aldehydes and urea, and "ketone resin" as meaning the condensation product of cyclohexanone or methylcyclohexanone, or the condensation product of cyclohexanone or methylcyclohexanone with urea or formaldehyde.

Powder paint according to any one of the preceding claims, characterized in that said at least one coated monochromatic pigment is formed by 80 to 20% by weight of said pigment and 80 to 20% by weight of said resin.

The pigments pre-coated with aldehyde or ketone resins, as described in international patent application PCT/IT2005/000443 filed on 26 Jul. 2005 by the same applicant, which is incorporated herein by way of reference, will be formulated taking into account the requirements for uniformity of specific weight. In particular, the constant specific weight level is obtained by correct metering of the components, resin, chromatic pigment, barium sulphate and calcium carbonate.

For this purpose, the simultaneous or alternative use of two inert fillers with a different specific weight was positively tested: blanc fixe with a specific weight of 4.37 g/cc and calcium carbonate with a specific weight of 2.71 g/cc.

These, suitably metered in a varying amount depending on:
the quantity of chromatic pigment and
the specific weight of the chromatic pigment are able to provide the mixture consisting of:
aldehyde or ketone resin
chromatic pigment
blanc fixe and
calcium carbonate
with a specific weight in keeping with the general system.

The production will take place in the manner described in the already mentioned international patent application PCT/IT2005/000443, by means of mixing of this compound and subsequent extrusion and subsequent cryogenic milling with selection of the ground particles in accordance with a particle-size curve where 90% is in the range of 10 to 40 microns; in particular, the monochromatic pigments coated with aldehyde or ketone resins, after the extrusion process are ground in cryogenic mills at temperatures below 10° C. until the abovementioned particle-size curve is reached.

These pre-coated pigments form the chromatic element of a tintometric system where they will be metered and mixed with powder conversion agents. Preferably, the powder paint according to the present invention will contain from 2 to 4 different monochromatic pigments selected from among organic pigments and inorganic pigments.

An example of a typical formula of the pre-coated pigment with a specific weight of about 1.5 g/cc is the following:

| Components in % | aa | bb | cc |
|---|---|---|---|
| Iron oxide pigment | 30 | | |
| Titanium oxide pigment | | 30 | |
| Organic pigment | | | 10 |
| Barium sulphate | 00 | 00 | 34.5 |
| Calcium carbonate | 9 | 8 | 00 |
| Coating resin | 61 | 62 | 55.5 |
| Specific weight of the formulated product (g/cc) | 1.50 | 1.50 | 1.50 |

List of the Pre-Coated Pigment Formulations Tested:
iron oxides pigments, in all their shades of yellow, red and black and in all their physical forms and particle-size categories;
titanium oxide pigments, in all their various inorganic surface treatments;
chromium oxide pigments, including those co-precipitated with nickel and nickel titanates;
black pigments from organic combustion;
blue and green pigments derived from copper phthalocyanine, also chlorinated and brominated, in the various alpha, beta and epsilon crystalline forms;
yellow pigments derived from lead sulphochromate;
yellow pigments derived from lead bismuth vanadate;
orange pigments derived from lead sulphochromate molybdate;
yellow pigments of an organic nature based on arylamides;
orange pigments of an organic nature based on naphthol;
orange pigments of an organic nature based on diketopyrrolo-pyrrole.
red pigments based on manganese salts of azo dyes;
red pigments based on manganese salts of beta-oxynaphthoic acid;
red organic quinacridone pigments;
red organic anthraquinone pigments.

According to one possible aspect of the invention, the coated monochromatic pigment consists of 80 to 20% by weight of inorganic pigment, preferably 50 to 70%, even more preferably 55 to 65%, and 80 to 20% by weight of resin, preferably 30 to 50%, even more preferably 35 to 45%.

According to a further possible aspect, the coated monochromatic pigment consists of 15 to 40% by weight of organic pigment, 45 to 75% by weight of resin, 1 to 20% by weight of mineral reinforcing filler and 0.1 to 10% by weight of dispersants; even more preferably 20 to 35% by weight of organic pigment, 50 to 70% by weight of resin, 5 to 15% by weight of mineral reinforcing filler and 1 to 7% by weight of dispersants. The mineral reinforcing filler is normally barium sulphate and/or calcium carbonate; the dispersants are normally selected from among sorbitan esters and epoxidized soybean oils, preferably epoxidized sorbitan ester.

The powder conversion agents are proper powder paints, which lack solely the pigmenting part which confers the colouring; namely binders. For the purposes of the present invention, the above-mentioned term also includes the possibility of using a monochromatic conversion agent based on white titanium dioxide restricted to the very light final colours.

They must preferably contain a variable quantity of blanc fixe and calcium carbonate so that they have the same specific predefined specific weight for the tintometric system, according to the present invention.

The conversion agents are produced using the normal systems for manufacturing powder paints by means of mixing of the components, followed by extrusion of the mixture and subsequent milling with selection of the particles, so that 90% of them lie within a particle-size curve of between 10 and 40 microns.

These conversion agents will be packaged inside containers and will be ready for pigmentation with pre-coated pigments of the system.

A list of the different types of binders tested as conversion agents for the tintometric system according to the present invention is provided below:
hydroxylated saturated polyesters cross-linked with TGIC (triglycidyl isocyanurate);
hydroxylated saturated polyesters cross-linked with Primid (hydroxyacylamide);
hydroxylated saturated polyesters cross-linked with blocked isocyanates;
carboxylated saturated polyesters cross-linked with epoxide resins, in weight ratios ranging from 70/30 to 50/50;
epoxides cross-linked with amine hardeners;
thermosetting acrylics;
systems based on PVDF (polyvinylidene fluoride).
All of these in the following versions:
smooth effect with glossy, semi-glossy and matte appearance;

embossed effect with glossy, semi-glossy and matte appearance;
sandblasted effect with semi-glossy and matte appearance;
metallized effect with glossy, semi-glossy and matte appearance;
hammered effect;
embossed effect;
mica-treated effect;
textured effect;
iridescent-coloured effect;
puckered effect.

The final powdered paint will be obtained, therefore, following the instructions of a formula in which it is envisaged performing mixing with a conversion agent selected from among those mentioned above, chosen in accordance with the functional characteristics which the final paint must satisfy, hence a conversion agent with which a certain required quality has been associated.

The conversion agent will be used in the minimum amount of 70% of the formulated product with a mixture of the pre-coated pigments, selected in accordance with the colorimetric characteristics of each of them, so as to obtain the final colour required as per the formulation system.

The pre-coated pigments will be used maximum amount of 30% of the formulated product.

Mixing must ensure that the mixture of the conversion agent with all the pre-coated pigments is completely homogeneous.

Typical formulations for the following colour intensity groups are shown below:

At present the conventional system for producing powder paints is performed with the following method:

mixing of raw materials, including chromatic pigments;
extrusion of all the components simultaneously;
milling in mills.

This process is used for all types of production batch, from a few kilos to various tonnes.

Clearly there is a great difference in the production costs between these two limits.

Alongside this process, which is used for more than 95% of the volume of powder paints produced today, a method has become established where, for a given quality, monochromatic basic colours, such as a normal powder described above, are prepared and the final colour is obtained, by mixing these basic colours to obtain the final colour.

Clearly the system is limited by the individual quality and therefore it is required to prepare different ranges of basic colours for each quality which is to be produced.

With the present invention, instead, it is possible to achieve the production of small batches with great cost-effectiveness since the components are produced on the basis of economy of scale and the final product is prepared with great flexibility and rapidity.

In practice, it has been established that the invention fulfils the task and achieves the predefined objects.

A method which offers various advantages has in fact been provided.

The monochromatic pre-coated pigments are produced in low-cost batches, using the standard system for producing powder paints.

| | LIGHT | | | MEDIUM | STRONG |
|---|---|---|---|---|---|
| | neutral | white | PASTEL | COLOURS | COLOURS |
| NEUTRAL CONVERTER | 70 | | 80/90 | 85/90 | 85/90 |
| WHITE CONVERTER | | 95 | | | |
| PRECOATED PIGMENTS | 30 | 5 | 20/10 | 15/10 | 15/10 |

A characteristic feature of the method according to the present invention consists in the fact that this mixture, applied to spray guns which use electrostatic systems for conveying the particles in the air as far as the part to be painted, remains homogeneous during the period of use, despite the presence of particles which have a heterogeneous chemical composition, but homogeneous physical structure, both as regards the dimensions, all being 90% within the range of 10 to 40 microns and as regards their mass; in fact, all the components have a specific weight with a variability factor within 0.1. g/cc.

Therefore the particles all have a selected volume and different chemical compounds, but a similar specific weight and therefore very similar mass.

The other characteristic feature of the method, according to the present invention, consists in the fact of obtaining a uniform colour surface, as is normally obtained from a powder paint prepared using a process involving mixing, extrusion and milling of all the components.

This is due to the use of pigments coated with aldehyde or ketone resins, in accordance with that described in PCT/IT2005/000443, which have the effect that during melting, prior to polymerization of the polymers acting as a vehicle and contained in the conversion agent, there is thorough mixing as confirmed by Benard's studies due to the great molecular mobility of the coating polymers, when they are in the melted state.

The typical conversion agents of varying quality—which are powder paints devoid of monochromatic pigments—chosen for the system, are produced in large batches.

The final powder paints are produced from the simple mixing of the conversion agents with the mixture of precoated pigments using highly flexible methods.

With the present invention, therefore, it is possible to construct a powder painting system where the individual colouring components and the vehicle conferring the quality, in keeping with the abovementioned principles of physics, form a whole, the particles of which move uniformly at least so as to obtain industrially processed products.

Moreover, the particular vehicle used to coat the pigments, in accordance with that described in PCT/IT2005/000443, allows homogeneous colour surfaces to be obtained.

With the present invention it is possible to produce powder paints, by preparing beforehand extruded and milled semifinished products and then mixing the various colorimetric compositions, depending on the colour required, without the drawback of an alteration in the colour owing to the varied movement of the particles and avoiding a non-homogeneous colour surface.

Obviously the articles used, as well as the dimensions, may be of any nature, according to requirements.

The invention also relates to an electrostatic painting method comprising the use of the powder paint described above.

The invention claimed is:

1. A thermosetting powder paint combination comprising:
   a conversion agent; and
   a monochromatic pigment coated with at least one aldehyde and/or ketone resin, at least one mineral reinforcing filler, and at least one dispersant, wherein the coated monochromatic pigment consists essentially of 15 to 40% by weight of the monochromatic pigment, 45 to 75% by weight of the aldehyde and/or ketone resin, 1 to 20% by weight of the mineral reinforcing filler and 0.1 to 10% by weight of the dispersant;
   wherein the conversion agent and the monochromatic pigment are adapted to be mixed together to form a thermosetting powder paint composition having not more than 30% by weight of the coated monochromatic pigment and up to 95% by weight of the conversion agent, wherein more than 90% of the particles of the coated monochromatic pigment and the conversion agent have a particle size of between 10 and 40 microns.

2. The combination according to claim 1, wherein in the thermosetting powder paint composition, more than 90% of the particles of the coated monochromatic pigment and the conversion agent have a particle size of between 15 and 35 microns.

3. The combination according to claim 1, wherein the thermosetting powder paint composition comprises from 5 to 30% by weight of the coated monochromatic pigment and from 70 to 95% by weight of the conversion agent.

4. The combination according to claim 1, wherein the specific weight of each the coated monochromatic pigment and the conversion agent is between 1.3 and 1.7 g/cc.

5. The combination according to claim 1, wherein the aldehyde and/or ketone resin has a mean molecular weight of between 800 and 2,000 Da and/or melting point of between 70° and 130° C.

6. The combination according to claim 1, wherein the aldehyde and/or ketone resin has a mean molecular weight of between 900 and 1400 Da and/or melting point of between 90° and 110° C.

7. The combination according to claim 1, wherein the aldehyde resin is the condensation product of aliphatic aldehydes and urea and/or the ketone resin is the condensation product of cyclohexanone or methylcyclohexanone.

8. The combination according to claim 1, wherein the ketone resin is the condensation product of cyclohexanone or methylcyclohexanone with urea or formaldehyde.

9. The combination according to claim 1, wherein the monochromatic pigment comprises from 2 to 4 different monochromatic pigments.

10. The combination according to claim 1, wherein the monochromatic pigment is selected from among organic pigments and inorganic pigments.

11. The combination according to claim 1, wherein the monochromatic pigment is selected from among iron oxides pigments, titanium oxide pigments, chromium oxide pigments, pigments derived from co-precipitated nickel and nickel titanates, black pigments from organic combustion, blue and green pigments derived from copper phthalocyanine, yellow pigments derived from lead sulphochromate or lead bismuth vanadate, orange pigments derived from lead sulphochromate molybdate, yellow pigments based on arylamides, orange pigments based on naphthol, orange pigments based on diketo-pyrrolo-pyrrole, red pigments based on manganese salts of azo dyes, red pigments based on manganese salts of beta-oxynaphthoic acid, red quinacridone pigments and red anthraquinone pigments or mixtures thereof.

12. The combination according to claim 1, wherein the coated monochromatic pigment consists of 20 to 35% by weight of organic pigment, 50 to 70% by weight of the aldehyde and/or ketone resin, 5 to 15% by weight of the mineral reinforcing filler and 1 to 7% by weight of the dispersant.

13. The combination according to claim 12, wherein the mineral reinforcing filler is barium sulphate and/or calcium carbonate.

14. The combination according to claim 1, wherein the said dispersant is selected from among sorbitan esters and epoxidized soybean oils.

15. The combination according to claim 1, wherein the conversion agent is at least one of neutral or monochromatic.

16. The combination according to claim 1, wherein the conversion agent is selected from among hydroxylated saturated polyesters cross-linked with triglycidyl isocyanurate, hydroxylated saturated polyesters cross-linked with hydroxyacylamide, hydroxylated saturated polyesters cross-linked with blocked isocyanates, carboxylated saturated polyesters cross-linked with epoxide resins in ratios of from 70/30 to 50/50 by weight, epoxides cross-linked with amine hardeners, thermosetting acrylics and/or systems based on polyvinylidene fluoride.

17. The method according to claim 1, wherein the specific weight of each the coated monochromatic pigment and the conversion agent has a maximum variability of ±0.1 grams per cubic centimeter (g/cc).

18. An electrostatic painting method comprising:
   providing a conversion agent;
   providing a monochromatic pigment coated with at least one aldehyde and/or ketone resin, at least one mineral reinforcing filler, and at least one dispersant, wherein the coated monochromatic pigment consists essentially of 15 to 40% by weight of the monochromatic pigment, 45 to 75% by weight of the aldehyde and/or ketone resin, 1 to 20% by weight of the mineral reinforcing filler and 0.1 to 10% by weight of the dispersant;
   mixing the conversion agent and the coated monochromatic pigment together to form a thermosetting powder paint composition having not more than 30% by weight of the coated monochromatic pigment and up to 95% by weight of the conversion agent, wherein more than 90% of the particles of the coated monochromatic pigment and the conversion agent have a particle size of between 10 and 40 microns; and
   applying the thermosetting powder paint composition.

* * * * *